United States Patent [19]

Schneider et al.

[11] 4,026,997
[45] May 31, 1977

[54] PROCESS FOR THE PRODUCTION OF AMMONIUM FLUORIDE FROM FLUOSILICIC ACID

[75] Inventors: Siegfried Schneider; Wolfgang Weis, both of Cologne; Volker Beyl, Leverkusen; Hans Niederprum, Monheim, all of Germany

[73] Assignee: Bayer Aktiengesellschaft, Leverkusen, Germany

[22] Filed: Apr. 13, 1976

[21] Appl. No.: 676,604

Related U.S. Application Data

[63] Continuation of Ser. No. 502,251, Aug. 29, 1974, abandoned.

[30] Foreign Application Priority Data

Sept. 21, 1973 Germany .......................... 2347485

[52] U.S. Cl. .................. 423/470; 423/339
[51] Int. Cl.$^2$ .................. C01C 1/16; C01B 33/12
[58] Field of Search .................. 423/470, 471, 339

[56] References Cited

UNITED STATES PATENTS

| 2,780,522 | 2/1957 | Gloss et al. | 423/470 |
| 2,816,818 | 12/1957 | Gross | 423/470 |
| 3,271,107 | 9/1966 | Nickerson et al. | 423/339 |
| 3,563,699 | 2/1971 | Cuneo | 423/339 |

Primary Examiner—Edward Stern
Attorney, Agent, or Firm—Burgess, Dinklage & Sprung

[57] ABSTRACT

In the production of an ammonium fluoride solution by precipitating hexafluosilicic acid from its solution with ammonia and from the resulting suspension separating off the silicon dioxide precipitated, the improvement which comprises thoroughly mixing the hexafluosilicic acid solution and ammonia at a temperature of about 40° to 90° C, in such proportions that the suspension obtained contains at least 1% of free ammonia and at most 22% of ammonium fluoride, the average residence time of the reactants in the precipitation zone being at least 4 minutes. Advantageously, the silicon dioxide is separated off from the suspension obtained without previous cooling, the resulting ammonium fluoride filtrate is left standing for at least 30 minutes to permit flocculation of silicon dioxide contained therein and the flocculated silicon dioxide is separated off.

5 Claims, No Drawings

PROCESS FOR THE PRODUCTION OF AMMONIUM FLUORIDE FROM FLUOSILICIC ACID

This is a continuation of application Ser. No. 502,251, filed Aug. 29, 1974, now abandoned.

This invention relates to a process for the production of an ammonium fluoride solution having a low $SiO_2$-content from fluosilicic acid and ammonia, the $SiO_2$ precipitated being readily filterable and the filter cake having a high solids content.

$H_2SiF_6$ is being increasingly obtained as a secondary product in the manufacture of phosphorus-containing fertilizers. $H_2SiF_6$ also accumulates during the production of HF from fluorspars containing $SiO_2$. One way of converting the fluorine present in the $H_2SiF_6$ into fluorine compounds having greater commercial value is to hydrolyze the fluosilicic acid with $NH_3$, $SiO_2$ being precipitated and an aqueous $NH_4F$-solution being obtained.

The principle on which the reaction is based is known and has already been applied in commercial processes. Thus, in one known process for the production of cryolite from fluorspar rich in $SiO_2$, a batch of $H_2SiF_6$ is slowly reacted with $NH_3$-gas in a first stage, the silica precipitated being removed by centrifuging. The suspension is cooled before centrifuging. In recent patents and applications such as U.S. Pat. Nos. 2,945,745 and 3,338,673, German DOS No. 1,767,465 and German DAS No. 1,811,178 $NH_3$-gas is also generally used and precipitation is carried out in batches in order to obtain readily filterable $SiO_2$ and complete precipitation. According to the process disclosed in U.S. Pat. No. 3,501,268 and German DOS No. 2,121,152, however, ammoniacal solutions are also used.

The use of gaseous ammonia is unfavorable in practice in that further processing of the $NH_4$-solution formed is generally accompanied by the liberation of an $NH_3/H_2O$ mixture which has to be worked up. The batch precipitation of $SiO_2$ is particularly disadvantageous in cases where the process as a whole, of which this stage is a part, is designed for continuous working because, in that case, corresponding equalizing vessels have to be used. However, there is always a degree of uncertainty in the fact that, in batch operation, the $SiO_2$ deposit is not always precipitated in the same form. This results in heavily fluctuating filtering rates and losses of yield through adsorption effects. In other known processes, the reaction is carried out at low temperatures (U.S. Pat. No. 2,780,522), or alternatively the entire suspension is cooled before filtration in order to complete the precipitation of the $SiO_2$ (U.S. Pat. No. 3,567,370, Austrian Pat. No. 214,409).

One disadvantage of these processes is that it is in batch operation that the freshly precipitated $SiO_2$ tends to cake, particularly on cooled surfaces, with the result that heat transfer is seriously impaired. In addition, the need for cooling, coupled with reheating of the filtered $NH_4F$-solution if it has to be further processed under heat, adds considerably to the energy consumption of these processes. Another disadvantage of their operation arises when $H_2SiF_6$ is initially introduced, because in that case corrosion of metallic materials occurs, whereas heat transfer is adversely affected in the case of coated reactors.

Accordingly, the object of the invention is to provide a continuous process for the production of $NH_4F$-solution from fluosilicic acid, in which a consistently readily filterable $SiO_2$- deposit with a high solids content in the filter cake, and a substantially Si-free $NH_4F$ solution are obtained in a simple operation.

Our own past experience has shown that the continuous precipitation of $SiO_2$ from $H_2SiF_6$ using excess ammonia always gives a suspension which, although readily filterable, results in filter cakes having a solids content of only 25 to 35%, depending upon the type of filtration unit employed. Due to its large surface structure, the $SiO_2$ is difficult to wash out, resulting in heavy losses in the yield of $NH_4F$. In addition, the deposit tends to clog the filter cloths after only a few days' operation.

Although separation can be carried out by means of a fully encased screw centrifuge (decanter), especially after the addition of organic flocculants, the thizotropic solid then becomes even more difficult to wash out.

It has now been found that ammonium fluoride solutions which are substantially free from $SiO_2$ can be obtained by continuously precipitating fluosilicic acid solutions with ammonia and separating off the $SiO_2$ precipitated using a process which is distinguished by the fact that fluosilicic acid solution and ammonia are continuously reacted with thorough mixing at a temperature in the range of about 40° to 90° C, in such a way that the suspension formed contains at least 1% of free $NH_3$ and at most 22% by weight of $NH_4F$, the average residence time of the reactants or suspension in the precipitation zone being at least 4 minutes.

It has surprisingly been found that, under the conditions according to the invention, the reaction can be controlled in such a way that the silica accumulates in the form of coarse particles which are easy to filter and wash out, leaving a non-thixotropic filter cake with a high solids content. In addition, the filtrate can be obtained substantially free from $SiO_2$ to such an extent that it can be further processed, for example into cryolite, of a purity adequate for the melt electrolysis of aluminum.

If the $SiO_2$-deposit is to accumulate in the form of coarse particles as described above, the precipitation reactor, for example in the form of a vessel equipped with a stirrer, must be of adequate dimensions. This reactor must be large enough to ensure that, during the actual precipitation process, the average residence time, calculated from volume and throughput, is at least 4 minutes, preferably between about 8 and 15 minutes. Although residence times longer than 15 minutes are also possible, they are unfavorable for economic reasons on account of the larger volume of the reaction vessel required. Precipitation is preferably carried out in a single stage rather than in cascades. On the other hand, however, it is advantageous for the precipitation reactor to be followed by one or more vessels in order to equalize the residence-time spectrum.

In one preferred embodiment, the continuous precipitation of $SiO_2$ in the stirrer-equipped reactor of appropriate size is carried out by introducing ammonia and/or $NH_3/H_2O$ vapor mixture and/or $NH_3$-solution, for example through inlet pipes extending almost to the bottom of the reactor, while the specifically heavier fluosilicic acid solution is best introduced slightly above the $NH_3$-inlet. The quantity of $NH_3$ is measured in such a way that the suspension formed contains at least 1% and preferably about 1.5 to 3.5% of free $NH_3$. The total concentration of the $NH_4F$-solution formed is adjusted by choosing suitable starting concentrations, preferably about 25 to 35% by weight of $H_2SiF_6$ and about 20 to 15% by weight of ammonia, optionally by the addition of water, in such a way that it amounts to at most 22% by weight, and preferably to between about 16 and 20% by weight, of $NH_4F$. The heat given off during the reaction causes the reaction mixture to boil, because the boiling point of the system, in the concentration ranges specified, amounts to about 80° C. However, boiling can be avoided by applying pressure. The greater the quantity of free ammonia dissolved in the suspension, the lower the boiling point, while the maximum soluble quantity of $NH_3$ is in turn governed by the $NH_4F$-concentration. Accordingly, excess heat is dissipated with the vapors as heat of evaporation without direct cooling.

Generally, the reaction is carried out at a temperature of about 40 to 90° C, preferably at a temperature of about 65° to 85° C.

After precipitation under the conditions specified above, the $SiO_2$ precipitated is separated off from the suspension. The usual units, such as suction filters, filter presses, decanters or centrifuges, can be used for this purpose. Since the $SiO_2$ accumulates in the form of very coarse particles, only short filtering times are required and washing out with $H_2O$ does not present any difficulties either. The filter cake accumulates having a solids content of about 55 to 75% by weight of $SiO_2$, and a fluoride content, of about 0.4 to 0.8% by weight of F, which is also extremely low. It can be of advantage for the actual precipitation vessel to be followed by one or two stirrer-equipped vessels. However, these vessels are only used for equalizing the residence-time spectrum. The clear filtrate containing ammonium fluoride can be further processed in known manner into fluorides, expecially cryolite.

In order to obtain substantially complete precipitation of $SiO_2$ in the suspension, it has been common practice in the past to cool the suspension and to allow it to stand and, optionally, to add foreign ions (Austrian Pat. No. 214,409). This is of advantage because the solubility of $SiO_2$ in ammonium fluoride increases with increasing temperature. With increasing temperature and, hence, increasing $NH_3$ vapor pressure, equilibrium is displaced in accordance with the equation $$2 NH_4F \rightarrow NH_3 + NH_4HF_2$$

so that the stability of the Si-F-complexes is also influenced. However, substantially complete removal of the $SiO_2$ from the ammonium fluoride solution can also be obtained, in accordance with the invention, by filtering off the suspension obtained after precipitation directly, i.e. without previous cooling. The $SiO_2$ still present in the initially clear filtrate is precipitated by allowing the filtrate to stand, optionally accompanied by the addition of flocculants. Residence times of at least 30 minutes, preferably 3 to 5 hours, are sufficient for this purpose. Any $NH_3$-losses from the filtrate should be avoided or compensated. There is no need for the filtrate to be additionally cooled during post-precipitation. Separation of the $SiO_2$-post precipitate leaves an ammonium fluoride solution substantially free from $SiO_2$ which can be further processed directly, i.e. without previous reheating.

The process according to the invention is illustrated by the following Examples wherein all parts are by weight unless otherwise expressed.

Example 1a

30% fluosilicic acid and 16% $NH_3$-solution were continuously introduced by means of metering pumps into a 1 liter stirrer-equipped vessel, in such a quantity that the volume of 1 liter remained constant when continuously pumping off at a rate of 5 liters per hour. Accordingly, the average residence time was 12 minutes. The ratio of $NH_3$ to fluosilicic acid was adjusted in such a way that the suspension contained 2.9% of free ammonia. The precipitation temperature was 81° C. 250 ml of this suspension were filtered through a suction filter, filtration time: 20 seconds. The filter cake was washed with 150 ml of $H_2O$ and dried at 105° C. Solids content: 61%, $SiO_2$-content of the filtrate ($NH_4F$-solution), 0.07% by weight.

EXAMPLE 1b

Ammonium fluoride solutions, which had been obtained by the process described in Example 1a, were stored in sealed bottles, one sample at room temperature (A) and one at 60° C (B). After 4 hours, the $SiO_2$ which had flocculated out was filtered off, washed, dried and weighed.

| A (22° C) | B (60° C) |
|---|---|
| 0.145 g/l | 0.106 g/l |
| 0.132 | 0.206 |
| 0.068 | 0.125 |

After this the clear filtrates still contained 0.045 to 0.053% of dissolved $SiO_2$.

EXAMPLE 2

Using the same test arrangement as in Example 1, the quantity of $H_2SiF_6$ was increased for the same $H_2SiF_6$ and $NH_3$-concentrations.

Residence time: 10 minutes, concentration of free $NH_3$ in the suspension: 1.6%, precipitation temperature: 64° C, filtration time for 250 ml: 25 seconds, solids content of the filter cake: 70%, SiOHd 2-content of the filtrate 0.06% by weight.

EXAMPLE 3

The same test arrangement as in Example 1 was filled with 30% $H_2SiF_6$ and 20% $NH_3$ solution. Residence time: 10 minutes, concentration of free $NH_3$: 1.5%, precipitation temperature: 82° C, filtration time for 250 ml: 17 seconds, solids content of the filter cake: 67%, $SiO_2$-content of the filtrate: 0.08% by weight.

EXAMPLE 4

30% $H_2SiF_6$ was continuously introduced into a 250 ml capacity stirrer-equipped vessel. In order to simulate the addition of $NH_3/H_2O$ vapors, a stream of $NH_3$ gas was passed through water kept at a temperature of 82 to 83° C, so that an approximately 50/50 $NH_3/H_2O$ vapor mixture was formed. This vapor was introduced into the precipitation vessel, resulting in vigorous boiling, accompanied by an increase in temperature. The boiling temperature was adjusted to 80°–81° C by continuously introducing water into the precipitation vessel, a free $NH_3$ concentration of about 2.6% being obtained in the suspension. The total quantities were selected in such a way that the average residence time in the reaction vessel was 12 minutes. After passing through a second stirrer-equipped vessel, the suspension was filtered. The filter cake was washed and dried at 105° C. Solids content: 67%, SiO$_2$-content of the filtrate: 0.07% by weight.

It will be appreciated that the instant specification and examples are set forth by way of illustration and not limitation, and that various modifications and changes may be made without departing from the spirit and scope of the present invention.

What is claimed is:

1. In the production of an ammonium fluoride solution by precipitating hexafluosilicic acid from its solution with ammonia and from the resulting suspension separating off the silicon dioxide precipitated, the improvement which comprises continuously and simultaneously feeding aqueous solutions of hexafluosilicic acid and ammonia to a mixed precipitation zone maintained at a temperature of about 40° to 90° C to form a suspension of silicon dioxide, the solutions being supplied in such proportions that the suspension obtained contains about 1.5 to 3.5% of free ammonia and at most 22% of ammonium fluoride, the average residence time of the reactants in the precipitation zone being about 8 to 15 minutes and filtering the solution to produce a filter cake comprising coarse SiO$_2$ having a solids content of about 55 to 75% by weight, the rate of filtration for a 250 ml aliquot portion being less than about 25 seconds.

2. The process of claim 1, wherein the suspension contains about 16 to 20% by weight of ammonium fluoride.

3. The process of claim 1, wherein the silicon dioxide is separated off from the suspension obtained without previous cooling, the resulting ammonium fluoride filtrate is left standing for at least 30 minutes to permit flocculation of silicon dioxide contained therein and the flocculated silicon dioxide is separated off.

4. The process of claim 3, wherein flocculation is carried out in the absence of cooling and the free ammonia content is kept at a value of about 1.5%.

5. The process of claim 4, wherein the reaction temperature is about 65° to 85° C, and the suspension contains about 16 to 20% by weight of ammonium fluoride.

* * * * *